(12) United States Patent
Rolstone

(10) Patent No.: US 8,678,826 B2
(45) Date of Patent: Mar. 25, 2014

(54) METHOD FOR CREATING A FOREIGN LANGUAGE LEARNING PRODUCT

(76) Inventor: Darrell Ernest Rolstone, Tambon Krasang (TH)

( * ) Notice: Subject to any disclaimer, the term of this patent is extended or adjusted under 35 U.S.C. 154(b) by 1442 days.

(21) Appl. No.: 12/118,169

(22) Filed: May 9, 2008

(65) Prior Publication Data

US 2008/0286731 A1 Nov. 20, 2008

Related U.S. Application Data

(63) Continuation-in-part of application No. 11/750,999, filed on May 18, 2007, now abandoned.

(51) Int. Cl.

| | |
|---|---|
| *G09B 19/06* | (2006.01) |
| *G09B 19/04* | (2006.01) |
| *G09B 5/06* | (2006.01) |
| *G09B 7/02* | (2006.01) |
| *G09B 5/04* | (2006.01) |
| *G11B 27/031* | (2006.01) |
| *G10L 15/26* | (2006.01) |
| *G09B 17/00* | (2006.01) |
| *G11B 27/10* | (2006.01) |
| *G11B 27/036* | (2006.01) |
| *G11B 20/10* | (2006.01) |
| *G06F 17/28* | (2006.01) |
| *H04N 21/81* | (2011.01) |

(52) U.S. Cl.
CPC ............... *G09B 19/06* (2013.01); *G09B 19/04* (2013.01); *G09B 5/06* (2013.01); *G09B 7/02* (2013.01); *G09B 5/04* (2013.01); G09B 5/065 (2013.01); G09B 17/00 (2013.01); *G11B 27/031* (2013.01); G11B 27/10 (2013.01); G11B 27/036 (2013.01); G11B 20/10527 (2013.01); *G10L 15/265* (2013.01); G06F 17/28 (2013.01); H04N 21/8106 (2013.01)
USPC .......................................................... 434/157

(58) Field of Classification Search
CPC .......... G09B 19/06; G09B 19/04; G09B 5/06; G09B 7/02; G09B 5/04; G09B 5/065; G09B 17/00; G11B 27/031; G11B 27/10; G11B 27/036; G11B 20/10527; G10L 15/265; G06F 17/28; H04N 21/8106
USPC ......... 434/156, 157, 162, 165, 167, 178, 185, 434/322, 323, 353; 283/46
See application file for complete search history.

(56) References Cited

U.S. PATENT DOCUMENTS

| | | | | |
|---|---|---|---|---|
| 5,275,569 | A | * | 1/1994 | Watkins ......................... 434/157 |
| 5,882,202 | A | * | 3/1999 | Sameth et al. ................. 434/157 |

(Continued)

OTHER PUBLICATIONS

PCT/ISA/220, PCT/ISA/237, and PCT/ISA/210 for PCT Application No. PCT/IB2008/003390.

*Primary Examiner* — Jack Yip
(74) *Attorney, Agent, or Firm* — Marc E. Hankin; Kevin Schraven; Jimmy Sauz

(57) ABSTRACT

Various embodiments of this invention disclose a method for learning a foreign language using a variety of media such as audio-video, audio, and written media. The diverse embodiments of the invention allow the student to learn a foreign language in an accelerated manner that creates a stress-free environment and lowers a student's effective barrier to learning a foreign language. In various embodiments of the invention, the foreign language is taught using audio-video media. The video presents a movie or television presentation. Meanwhile, the original audio portion is replaced with an audio track, which is developed using the principles of the invention. The audio comprises the "phrases or complete thoughts" of the original video that are segmented and presented in alternating sections of native and foreign language. By presenting the native language "phrases or complete thoughts" immediately followed by same "phrase or complete thought" in the foreign language, the student is afforded the opportunity to develop associations between the two.

13 Claims, No Drawings

(56) References Cited

U.S. PATENT DOCUMENTS

| | | | |
|---|---|---|---|
| 6,859,778 B1* | 2/2005 | Bakis et al. | 704/277 |
| 7,149,690 B2* | 12/2006 | August et al. | 704/270 |
| 7,512,886 B1* | 3/2009 | Herberger et al. | 715/723 |
| 7,890,867 B1* | 2/2011 | Margulis | 715/723 |
| 2002/0086269 A1* | 7/2002 | Shpiro | 434/156 |
| 2002/0087569 A1* | 7/2002 | Fischer et al. | 707/100 |
| 2003/0040899 A1* | 2/2003 | Ogilvie | 704/2 |
| 2003/0203343 A1* | 10/2003 | Milner | 434/157 |
| 2004/0152054 A1* | 8/2004 | Gleissner et al. | 434/156 |
| 2004/0152055 A1* | 8/2004 | Gleissner et al. | 434/169 |
| 2004/0234934 A1* | 11/2004 | Shin et al. | 434/308 |
| 2005/0010952 A1* | 1/2005 | Gleissner et al. | 725/46 |
| 2006/0019223 A1* | 1/2006 | Wood et al. | 434/156 |

* cited by examiner

METHOD FOR CREATING A FOREIGN LANGUAGE LEARNING PRODUCT

CROSS-REFERENCE TO RELATED APPLICATIONS

This application is a continuation-in-part of prior non-provisional application Ser. No. 11/750,999, filed on May 18, 2007, now abandoned and was subject to accelerated examination, entitled "System and Method for Teaching a Foreign Language," to inventor D. Ernest Rolstone, et al., the contents of which are incorporated herein.

FIELD OF INVENTION

This invention relates, generally, to a novel method for teaching; more particularly, to a novel method for teaching foreign languages using a number of types of media.

BACKGROUND

The importance of learning foreign languages is demonstrated by the prevalence of foreign language courses in secondary schools, colleges, universities, and private language teaching centers. Furthermore, innumerable books, audio tapes and compact discs, and videos, CD-ROM, and other such media are devoting systems and methods for teaching foreign languages. The common pedagogical methods are time consuming and ineffective because they do not leverage the student's knowledge of a native language in order to teach the foreign language. Rather, these common pedagogical methods teach foreign languages by, first teaching words, then, teaching conjugations, and, finally, teaching sentences. As such, these methods can be time-consuming and ineffective because of the time needed before the student works with the phrases that are commonly used in communication. (See Jessica M. Werstler, "Total Physical Response Story Telling: A Study in Actively Engaging Students Across the Modalities" wherein Werstler states that of 95% of college graduates that studied a foreign language, only 5% of those reported felt comfortable using that foreign language).

Other systems and methods have sought to improve upon the conventional systems for teaching foreign languages. U.S. Pat. No. 5,882,202 to Sameth et al., for example, discloses a method and apparatus for aiding foreign language instruction that operates using a computer. Sameth's invention teaches foreign languages using a story by displaying selected frames about the story and dialog balloons that include phrases in the foreign language. Translations of the phrases are also displayed. As a further aid, a pronunciation guide is displayed through the animated representation of a person's lips in order to show the correct pronunciation of the words. Sameth's device, however, fails to disclose a system and method where languages are taught by interspersing phrases in the native and foreign language in a media presentation.

Another such system and method is disclosed by U.S. Pat. No. 6,341,958 to Zilberman. Zilberman's method comprises, first, developing in the student the skill of simultaneously reading, listening, and repeating a recorded text in the student's native language. Next, the student listens to a recording of the predetermined text in the foreign language and simultaneously reads and speaks the text. Finally, the student is instructed to write as many of the words and phrases as possible in the foreign language based on memory. Zilberman's system and method, however, fails to disclose a system and method for learning a foreign language that uses multimedia sources to teach the student.

Another such system is disclosed by U.S. Pat. No. 6,736,641 to Quiroz. Quiroz's patent discloses a teaching method that uses a one-page folded pamphlet. One portion of the pamphlet features words in the native language and another portion of the pamphlet features words in the foreign language. When folded, the sections allow the user to understand and assemble sentences in the foreign language. Quiroz's device, however, is limited to a distinct number of words and is not useful to learn a foreign language in a conversational manner.

Another such aid for learning a foreign language is disclosed by U.S. Pat. No. 5,178,542 to Chigrinsky. Chigrinsky discloses a book with pictures and words whose pages feature alternating transparent sheets, which overlay the book pages. The transparent overlay pages translate the text of the book's pages in the foreign language. In this manner, the student is able to use the book to, first, read the text in the native language, and second, review the text with the translated text alongside the native language.

Another such method for teaching a foreign language is disclosed by U.S. Pat. No. 5,649,826 to West et al. West's patent discloses a method for teaching a foreign language using entertainment on a media series. The media series features the native language as well as the foreign language in a series of lessons, which progressively use more and more of the foreign language. In this manner, the student is progressively exposed to more and more of the foreign language as the series progresses, with the final lesson containing the highest percentage of the foreign language.

While the above systems, methods, and devices disclose varied methods for teaching a foreign language, none of the devices allows media to be used in order to teach a foreign language wherein phrases or complete thoughts are presented, first, in the native language and, second, in the foreign language. Thus, there remains a long felt need in the art for such a device.

DETAILED DESCRIPTION OF THE INVENTION

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or systems have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention.

In the following description, certain terminology is used to describe certain features of one or more embodiments of the invention. Although not specifically disclosed or claimed, the principles of the invention may be practiced using any language as the native language and any other language as the foreign language. It should be further noted that the principles of the invention may be practiced with students of all ages and in order to learn languages at varying levels of difficulty.

Various embodiments of the invention are directed towards improving upon the above shortcomings by disclosing a system and method for learning a foreign language that is built upon the phrases or complete thoughts in the native language which the student already knows. The phrases or complete thoughts are always complete thoughts or phrases. The term "complete thought" means the smallest portion or smallest discrete unit of communication such as one or more words that is, in itself, an understandable unit of communication. Various embodiments of the invention use one or more media types in order to teach the foreign language. These media include: audio-video media, such as Digital Video Discs (DVD's), Video Home System (VHS) cassettes, Blu-Ray® Discs (BD), high definition optical discs, computer game systems and consoles, interactive computer game systems and consoles, portable computer game systems and consoles, Video on Demand, Download to Own, video iPod®, portable video media players, and Compact Disc Read Only Memory (CD ROM) and other such audio-video media; audio media, such as Compact Discs (CD's), MP3 audio, MP4, audio iPod®, and compact cassettes, and other such audio media; and written and print media such as books, pamphlets, magazines, newsletters, newspapers, language learning books, language learning books with visual aids, language learning books with non-visual aids, unbound books, and leafs.

Various embodiments of the invention use one or more media works in order to teach the foreign language. These media works include: films, movies, animated films, animated movies, television productions, recorded theater productions, taped theater productions, audio books, and written and printed works. These media works often require the integrated use of one or more media types for enjoyment of the media work.

In various embodiments of the invention, the material presented on the media is the same material as is conventionally marketed with such media including movies, animated works, audio books, novels, periodicals, and other such information. In this manner, various embodiments of the invention utilize existing entertaining media types in order to teach the foreign language. The use of existing entertaining media allows the foreign languages to be taught in an entertaining and stress free environment and using media that may be selected by the student.

Various embodiments of the invention present the native language and foreign language, each sectioned into discrete phrases or complete thoughts. In this manner, the invention improves upon prior art language teaching systems and methods by focusing on words in groups comprising complete thoughts or phrases. The invention, thus, improves upon prior art systems that systematically teach individual words, verbs, conjugations, and other such elements of sentence structure.

In various embodiments of the invention, the foreign language is taught using audio-video media. The video presents a movie or television presentation. Meanwhile, the audio portion of the video is replaced with an audio track, which is developed using the principles of the invention. The audio comprises the "phrases or complete thoughts" of the original video that are segmented and presented in alternating sections of native and foreign language. By presenting the native language immediately followed by the foreign language, the student is afforded the opportunity to develop associations among the two.

In various embodiments of the invention, a presentation of the native language and foreign language material is developed as follows. An existing entertaining media work, such as an animated movie that has been produced by a movie studio and has previously been released to the public, is made available in digital format. Preferably, the animated movie is available with a dialogue soundtrack, also known as a dialogue stream, in at least two (2) different languages. The first language is the native language and the second language is a foreign language. Digital editing software, as known to those skilled in the art, allows manipulation of the visual stream, dialogue stream, and other audio sound tracks of the animated movie. In a post production studio, that includes such equipment as a computer, monitor, speakers, audio equipment, and digital editing software, an editor, a person skilled in using editing software, makes two (2) copies of the digitally recorded animated movie onto the computer with the sound editing software. One copy of the movie is played in the native language, and the other copy of the movie is played in the foreign language. The editor now has the same animated movie running in two different languages on the same computer, which also has the sound editing software. The editor, using the sound editing software, forwards both copies of the movies to the exact same point, such as the point just before the first dialogue in the movie is heard. The native language copy of the movie is run and then paused after the completion of the first dialog phrase or complete thought. The editor determines how long this phrase or complete thought lasted in the native language copy of the movie and then copies that segment of the dialogue stream of the foreign language copy of the movie. The editor then pastes the copied segment of the sound stream of the foreign language copy of the movie into the native language copy of the movie. The process of pasting the foreign language sound stream segment into the native language copy of the movie is called splicing. The native language copy of the movie, with the recently spliced foreign language sound segment, is referred to as the master copy. If the editor replays the master copy, the first native language dialog phrase or complete thought will immediately be followed by that same phrase or complete thought in the foreign language. The visual stream of the master copy of the animated movie, meanwhile, is no longer in synchronization with the recently edited sound stream. To alleviate this issue, the editor pauses the master copy of the animated movie immediately after the recently added foreign language sound segment. The editor slows down the visual stream of the master copy, effectively expanding the visual stream to incorporate the additional time that has been added to incorporate the foreign language segment. The act of slowing down the visual stream with digital editing equipment is simple as long as the editor knows where to begin and end the slowing down. Digital visual stream editing, if used to slow down the video stream, allows the user to affect the changes needed to synchronize with the now longer dialogue stream, without sacrificing picture quality or creating a choppy video. If the editor is splicing a foreign dialogue stream, when the speech is in the form of narration, it may not be necessary to slow down the visual stream. Instead the editor would merely overlay the blank area of the native dialogue stream with the appropriate foreign dialogue stream. This method of splicing and subsequent slowing down of the visual stream is repeated until the animated movie's dialogue is completed. The non-dialogue audio streams do not require splicing, but they may require slight manipulation with the digital editing equipment so that they are synchronized with the slightly altered video stream of the master copy.

In various embodiments of the invention, the native language and the foreign language may exchange positions relative to the user. With this embodiment, advanced foreign language learners can use an embodiment of the invention wherein the foreign language is first and the native language is second. In various embodiments of the invention, the editor creates a plurality of new audio dialogue streams using the same editing process detailed above. The audio dialogue streams differ in what speed the foreign language audio phrases or complete thoughts playback to the learner. The editor can add in the foreign language audio phrases or complete thoughts at a slower speed, relative to the native language. In this manner, a beginning learner can hear the foreign language more clearly and with less frustration. With digital editing equipment it is possible to slow down the foreign language audio track to any number of slower, or even faster, speeds and at the same time keep the native language consistent. Similarly, both the foreign language and native language audio tracks may be slowed down, or sped up, relative to the normal speed of the original audio track. Once all of the new audio dialogue streams are finished, with a range of speeds in the foreign language and/or a range of speeds in the native language, the editor must synchronize each of these new audio dialogue streams to the other video and audio streams. The editor would synchronize the streams using the same process described above.

In various embodiments of the invention, the video presentation must be adjusted in order to accommodate the new audio track. Because presenting the audio in both languages takes longer, the video may require slowing down and/or manipulating in various manners. In various embodiments of the invention, the audio of the foreign language is presented in varying speeds, in order to accommodate students of varying proficiencies.

In various embodiments of the invention the speed of the new audio track may be selected by the user in order to accommodate students of varying proficiencies. If a beginning student selects a slower audio track, he or she will be able to more easily follow the dialogue of the media work being listened to or watched. As the student becomes more proficient with the foreign language they are trying to learn, the student may select a faster audio track. The most proficient of students may select the fastest audio track. The varying of speeds allows beginning students to not get frustrated with the rapid fire dialogue in many existing media works, and the varying of speeds allows more proficient students to not get bored with the slow pace of a permanently slowed down dialogue. Various embodiments of the invention will preferably have at least three (3) speeds and preferably have no more than five (5) speeds. Various embodiments of the invention will preferably have a fastest speed that is comparable to normal dialogue speed.

In the embodiments of the invention that utilize audio presentations (without video) the discrete phrases or complete thoughts are, likewise, presented in alternating sections of native and foreign language. Thus, when listening to a story, the student first hears a phrase in the native language and, immediately afterwards, hears the same phrase in the foreign language. With audio media presentations, the speed of the presentation may, likewise, be adjusted to accommodate the proficiency of the student.

In various embodiments of the invention, the principles of the invention may be practiced using printed media. The printed media may comprise a book, magazine, leaf, or further such media. In the written embodiments of the invention, the phrases are printed in the native language and the target language is printed immediately alongside the native language. In various embodiments of the invention, varying colors and fonts are used in order to distinguish among the two.

It is speculated, but not specifically claimed, that the invention shortens the time needed in order to learn a foreign language by building associations between the phrases in the two languages in the learner's mind. Thus, the new phrases are learned and remembered alongside the native language phrases. In this manner, the method allows the learner to leverage the knowledge of the native language, gained over the course of his or her life, in order to improve and accelerate their learning a foreign language.

It is speculated, but not specifically claimed, that by splicing the native language phrases/complete thoughts, one by one, with the foreign language translation, the foreign phrases/complete thoughts are effectively being piggybacked onto the native language phrases, thus making use of the learner's own pre-existing neural pathways used to download and store the user's own native language; thereby leveraging the user's native language skills to more easily acquire target language skills.

In summary, various embodiments of the invention disclose a method that allows improved learning of foreign languages through the above method.

What is claimed is:

1. A media based method for creating a foreign language learning audio-video work, comprising the steps of:
   providing an editing device;
   providing a prepared audio-video work;
   loading said prepared audio-video work on said editing device;
   wherein said prepared audio-video work comprises a dialogue stream and a visual stream;
   wherein said dialogue stream is comprised of a plurality of complete thoughts;
   wherein said complete thoughts are comprised of one or more words;
   wherein an editor determines what are said plurality of complete thoughts;
   wherein said dialogue stream is in a native-language;
   dividing manually, by said editor via said editing device, said plurality of complete thoughts of said dialogue stream into a plurality of smallest discrete units of complete thoughts in a native language;
   translating each of said plurality of smallest discrete units of complete thoughts in a native language into a foreign language, such that a plurality of corresponding discrete foreign language complete thoughts is created;
   splicing, by said editing device, said plurality of smallest discrete units of complete thoughts in a native language with said plurality of corresponding discrete foreign language complete thoughts;
   wherein said splicing step is based upon said plurality of smallest discrete units of complete thoughts, such that each of said plurality of corresponding discrete foreign language complete thoughts are placed immediately after each of said plurality of smallest discrete units of complete thoughts in a native language in an alternating manner to create a combined native language and foreign language dialogue stream;
   wherein said combined native language and foreign language dialogue stream replaces said dialogue stream on said prepared audio-video work;
   slowing down by said editing device said visual stream such that said visual stream is synchronized with said combined native language and foreign language dialogue stream, such that a foreign language learning audio-video work is created.

2. The media-based method for creating a foreign language learning audio-video work according to claim 1, wherein said prepared audio-video work is a media work selected from the group of media works consisting of: movies, animated films, television productions, and taped theater productions.

3. The media-based method for creating a foreign language learning audio-video work according to claim 1, wherein a speed of one or more of said plurality of corresponding discrete foreign language complete thoughts are spliced at a slower speed than a corresponding speed of one or more of said plurality of smallest discrete units of complete thoughts in a native language.

4. The media-based method for creating a foreign language learning audio-video work according to claim 1, wherein a speed of said one or more of said plurality of corresponding discrete foreign language complete thought is selected by a user.

5. The media-based method for creating a foreign language learning audio-video work product according to claim 1, wherein a speed of one or more of said plurality of corresponding discrete foreign language complete thoughts and wherein a speed of one or more of said plurality of smallest discrete units of complete thoughts in a native language are spliced at a slower speed relative to a normal speed of said dialogue stream of said prepared audio-video work.

6. The media-based method for creating a foreign language learning audio-video work according to claim 1, wherein a speed of said combined native language and foreign language dialogue stream is selected by a user.

7. The media-based method for creating a foreign language learning audio-video work according to claim 1, further comprising the steps of:
providing a media player;
playing on said media player said foreign language learning audio-video work;
learning a foreign language by a viewer of said foreign language learning audio-video work.

8. A media based method for creating a foreign language learning audio-video work, comprising the steps of:
providing an editing device;
providing a prepared audio-video work;
loading said prepared audio-video work onto said editing device;
wherein said prepared audio-video work comprises a native language dialogue stream and a visual stream;
providing a foreign language copy of said prepared audio-video work;
loading said foreign language copy of said prepared audio-video work onto said editing device;
wherein said foreign language copy of said prepared audio-video work comprises a foreign language dialogue stream;
wherein said native language dialogue stream and said foreign language dialogue stream are each comprised of a plurality of smallest discrete units of complete thoughts;
wherein an editor determines what are said plurality of smallest discrete units of complete thoughts;
wherein said plurality of smallest discrete units of complete thoughts are comprised of one or more words;
dividing manually, by said editor via said editing device, said plurality of smallest discrete units of complete thoughts of said dialogue stream and said foreign language dialogue stream, such that a plurality of smallest discrete units of foreign language complete thoughts and a plurality of smallest discrete units of native language complete thoughts, which correspond to each other, are created;
copying one or more of said plurality of smallest discrete units of foreign language complete thoughts to create one or more copied plurality of smallest discrete units of foreign language complete thoughts;
splicing, by said editing device, said one or more copied plurality of smallest discrete units of foreign language complete thoughts with said plurality of smallest discrete units of native language complete thoughts;
wherein said splicing step is based upon said plurality of smallest discrete units of complete thoughts, such that each of said one or more copied plurality of smallest discrete units of foreign language complete thoughts are placed immediately after each of said plurality of smallest discrete units of native language complete thoughts, to which said one or more copied discrete foreign language complete thoughts correspond, to create a combined native language and foreign language dialogue stream;
wherein said combined native language and foreign language dialogue stream replaces said native language dialogue stream on said prepared audio-video work;
slowing down by said editing device said visual stream such that said visual stream is synchronized with said combined native language and foreign language dialogue stream, such that a foreign language learning audio-video work is created.

9. The media-based method for creating a foreign language learning audio-video work according to claim 8, wherein a speed of one or more of said plurality of smallest discrete units of foreign language complete thoughts are spliced into said combined native language and foreign language dialogue stream at a slower speed than a corresponding speed of one or more of said plurality of smallest discrete units of native language complete thoughts.

10. The media-based method for creating a foreign language learning audio-video work according to claim 9, wherein a speed of said one or more of said plurality of smallest discrete units of foreign language complete thought is selected by a user.

11. The media-based method for creating a foreign language learning audio-video work product according to claim 8, wherein a speed of one or more of said plurality of smallest discrete units of foreign language complete thoughts and wherein a speed of one or more of said plurality of smallest discrete units of native language complete thoughts are both slowed down relative to a normal speed of said native language dialogue stream.

12. The media-based method for creating a foreign language learning audio-video work according to claim 11, wherein a speed of said combined native language and foreign language dialogue stream is selected by a user.

13. The media-based method for creating a foreign language learning audio-video work according to claim 8, further comprising the steps of:
providing a media player;
playing on said media player said foreign language learning audio-video work;
learning a foreign language by a viewer of said foreign language learning audio-video work.

* * * * *